United States Patent
Sano et al.

(10) Patent No.: US 10,245,527 B2
(45) Date of Patent: Apr. 2, 2019

(54) SOLID-LIQUID SEPARATION DEVICE

(71) Applicant: HITACHI, LTD., Tokyo (JP)

(72) Inventors: Tadashi Sano, Tokyo (JP); Hiroshi Kusumoto, Tokyo (JP); Michiharu Watanabe, Tokyo (JP); Mitsuhiro Matsuzawa, Tokyo (JP)

(73) Assignee: HITACHI LTD., Tokyo (JP)

( * ) Notice: Subject to any disclaimer, the term of this patent is extended or adjusted under 35 U.S.C. 154(b) by 50 days.

(21) Appl. No.: 15/546,904

(22) PCT Filed: Jan. 28, 2015

(86) PCT No.: PCT/JP2015/052253
§ 371 (c)(1),
(2) Date: Jul. 27, 2017

(87) PCT Pub. No.: WO2016/121012
PCT Pub. Date: Aug. 4, 2016

(65) Prior Publication Data
US 2018/0028935 A1  Feb. 1, 2018

(51) Int. Cl.
*B01D 11/02* (2006.01)
*B01D 12/00* (2006.01)
(Continued)

(52) U.S. Cl.
CPC .......... *B01D 11/0296* (2013.01); *B01D 11/02* (2013.01); *B01D 12/00* (2013.01);
(Continued)

(58) Field of Classification Search
CPC .... B01D 11/0296; B01D 11/02; B01D 12/00; B09C 1/02
See application file for complete search history.

(56) References Cited

U.S. PATENT DOCUMENTS

2005/0210701 A1  9/2005  Kanda et al.
2010/0101928 A1  4/2010  Kanda et al.

FOREIGN PATENT DOCUMENTS

JP  56-67503 A  6/1981
JP  2011-031170 A  2/2011
(Continued)

OTHER PUBLICATIONS

International Search Report for WO 2016/121012 A1, dated Apr. 28, 2015.
(Continued)

*Primary Examiner* — Sean E Conley
(74) *Attorney, Agent, or Firm* — Volpe and Koenig, P.C.

(57) ABSTRACT

A solid-liquid separation device performs dehydration/deoiling from a mixture of water and/or oil and a solid. Substance A is capable of dissolving water and oil. The device includes substance B circulated while generating phase change in a closed system; a compressor; a first heat exchanger exchanging condensation heat of substance B and evaporation heat of substance A; a second heat exchanger exchanging evaporation heat of substance B and condensation heat of substance A; and a treatment tank for mixing substance A with an object to be treated; substance A having been evaporated while separated from the water or the oil in the first heat exchanger, and condensed in the second heat exchanger. The first heat exchanger is lower than the treatment tank in a vertical direction, and a connection port of the first heat exchanger and a lower portion of the treatment tank are connected with a flow path.

8 Claims, 3 Drawing Sheets

(51) Int. Cl.
  *B01J 20/20* (2006.01)
  *B09C 1/02* (2006.01)
  *B09C 1/08* (2006.01)
  *C02F 11/14* (2019.01)
  *B01D 15/20* (2006.01)
  *C02F 1/28* (2006.01)
  *C11B 1/10* (2006.01)
  *F25B 1/00* (2006.01)
  *C02F 1/02* (2006.01)
  *C02F 1/26* (2006.01)
  *B01J 20/34* (2006.01)

(52) U.S. Cl.
  CPC ............ *B01D 15/203* (2013.01); *B01J 20/20* (2013.01); *B01J 20/3416* (2013.01); *B01J 20/3458* (2013.01); *B09C 1/02* (2013.01); *B09C 1/08* (2013.01); *C02F 1/02* (2013.01); *C02F 1/26* (2013.01); *C02F 1/283* (2013.01); *C02F 11/14* (2013.01); *C11B 1/10* (2013.01); *F25B 1/00* (2013.01); *C02F 2303/16* (2013.01)

(56) References Cited

FOREIGN PATENT DOCUMENTS

| | | |
|---|---|---|
| JP | 2013-203760 A | 10/2013 |
| JP | 2014-004520 A | 1/2014 |
| WO | 01/17647 A1 | 3/2001 |
| WO | 2003/101579 A1 | 12/2003 |
| WO | 2008/111483 A1 | 9/2008 |
| WO | 2015/015631 A1 | 2/2015 |
| WO | 2015/033455 A1 | 3/2015 |

OTHER PUBLICATIONS

Japanese Office Action dated Sep. 11, 2018 for the Japanese Patent Application No. 2016-571562.

SOLID-LIQUID SEPARATION DEVICE

TECHNICAL FIELD

The present invention relates to a solid-liquid separation device that separates a liquid and a solid.

BACKGROUND ART

There are [PTL 1] and [PTL 2] as background arts of the present technical field.

[PTL 1] discloses a configuration to remove moisture from coal that contains moisture, using a cycle of phase change of a substance A that is a gas at normal temperature and pressure and capable of dissolving water in a liquefied state.

PTL 2: discloses a heat source used for a cycle of phase change of a substance A and a method of using the heat source.

CITATION LIST

Patent Literature

PTL 1: WO 2003/101579
PTL 2: WO 2008/111483

SUMMARY OF INVENTION

Technical Problem

There are various substances A that are gases at normal temperature and pressure and can dissolve water and oil when liquefied. [PTL 1] is disclosed as a solid-liquid separation technique using characteristics of the substance A. In [PTL 1], dimethyl ether (DME) is selected as an example of the substance A, and is used for removal of moisture in coal. Here, a compressor is used to change a phase of DME, and an oil-free compressor needs to be selected as the compressor used here. Models of the oil-free compressor include a turbo refrigerator, a screw refrigerator, and a reciprocating refrigerator. However, no commercially appropriate compressors exist for the solid-liquid separation using the substance A because of problems such as too large minimum processing amount and a short maintenance interval.

To efficiently operate the DME cycle, the amount of DME circulated in the cycle needs to be appropriately maintained. However, if the amount of DME in the cycle is large, a liquid phase unfavorable for heat exchange occurs in a heat exchanger. On the other hand, in a case where the amount of DME is small, a gas-liquid two-phase flow occurs in a position where the phase is supposed to be a liquid phase in the cycle, and efficiency of the cycle is decreased. Therefore, an enclosed amount of DME in the cycle to highly efficiently operate the cycle has a very narrow range of appropriate amount. However, the appropriate amount in the cycle needs to be comprehensively calculated using a P-H diagram from measured temperature/pressure/flow rate, and the like, and precise grasping and control of the amount of DME in the cycle is difficult.

[PTL 2] discloses a configuration to use heat of an external environment for supply of heat of condensation and heat of evaporation of DME. In a method depending on an outside for a heat source, the efficiency of this method is substantially decreased if an external medium of temperature necessary for the phase change cycle of DME cannot be sufficiently obtained. Further, even if the external medium of appropriate temperature can be obtained, sensible heat of the external heat source is used, and thus the heat exchange efficiency is lower than that of [PTL 1], and the heat exchanger needs to be increased in size. Further, in the case of using the external medium depending on an environment as the heat source, impurities are often contained, and which cause pollution and blockage on an external medium side of the heat exchanger and decrease the heat exchange efficiency. Therefore, highly frequent maintenance is required. Further, in both the PTLs, a device configuration to collect the substance A in taking out the object to be treated to an outside of a treatment device, and thus the amount of the substance A opened to the atmosphere tends to be increased with the increase in size of the device.

Therefore, the present invention provides a solid-liquid separation device that can efficiently perform phase change of the substance A, and can decrease external emission of the substance A at the time of replacement of an object to be dealt of treatment.

Solution to Problem

To solve the above problem, the present invention is a solid-liquid separation device that performs dehydration or deoiling from an object to be treated that is a mixture of water and a solid, a mixture of oil and a solid, or a mixture of water, oil, and a solid, as the object to be treated, using a substance A capable of dissolving water and oil, the solid-liquid separation device including a substance B that is circulated while generating phase change in a closed system, compression means that compresses the substance B, a first heat exchanger that exchanges heat of condensation of the substance B and heat of evaporation of the substance A, a second heat exchanger that exchanges heat of evaporation of the substance B and heat of condensation of the substance A, and a treatment tank in which the substance A is mixed with the object to be treated, the substance A having been evaporated while separated from the water or the oil in the first heat exchanger, and condensed in the second heat exchanger, wherein the first heat exchanger is installed in a lower portion than the treatment tank in a vertical direction, and a connection port of the first heat exchanger and a lower portion of the treatment tank are connected with a flow path.

Further, to solve the above problem, the present invention is a solid-liquid separation device that performs dehydration or deoiling from an object to be treated that is a mixture of water and a solid, a mixture of oil and a solid, or a mixture of water, oil, and a solid, as the object to be treated, using a substance A capable of dissolving water and oil, the solid-liquid separation device including a substance B that is circulated while generating phase change in a closed system, compression means that compresses the substance B, a first heat exchanger that exchanges heat of condensation of the substance B and heat of evaporation of the substance A, a second heat exchanger that exchanges heat of evaporation of the substance B and heat of condensation of the substance A, a treatment tank in which the substance A is mixed with the object to be treated, the substance A having been evaporated while separated from the water or the oil in the first heat exchanger, and condensed in the second heat exchanger, and a third heat exchanger installed downstream of the treatment tank and upstream of the first heat exchanger in a flow path system of the substance A, and which switches a flow path of the substance B flowing into the heat exchanger 1 in an upper stream of the heat exchanger 1 to exchange heat between the substance B and the substance A, wherein the third heat exchanger is installed in a lower portion than the treatment tank in a vertical direction.

Further, the present invention is characterized that a flow path of the substance B is installed above a liquid level of the substance A in the second heat exchanger in the solid-liquid separation device.

Further, in the present invention, a flow path of the substance B is installed below a liquid level of the substance A in the first heat exchanger in the solid-liquid separation device.

Further, in the present invention, oils and fats are able to be extracted by filling the treatment tank with plant cells or animal cells in the solid-liquid separation device.

Further, in the present invention, moisture is able to be removed from sludge that is generated in water treatment by filling the treatment tank with the sludge in the solid-liquid separation device.

Further, in the present invention, filthy water is able to be continuously purified by filling the treatment tank with activated carbon, and alternately switching the filthy water and the substance A to cause the filthy water and the substance A to come in contact with the activated carbon in the solid-liquid separation device.

Further, in the present invention, the substance A is dimethyl ether in the solid-liquid separation device.

Advantageous Effects of Invention

According to the present invention, among devices that perform solid-liquid separation, using a cycle of phase change of a substance A, a solid-liquid separation device that can perform the phase change of the substance A by temperature change for which a device configuration is easy, and can reduce an emission amount of the substance A to an outside of the cycle can be provided.

DESCRIPTION OF EMBODIMENTS

Figure 1:
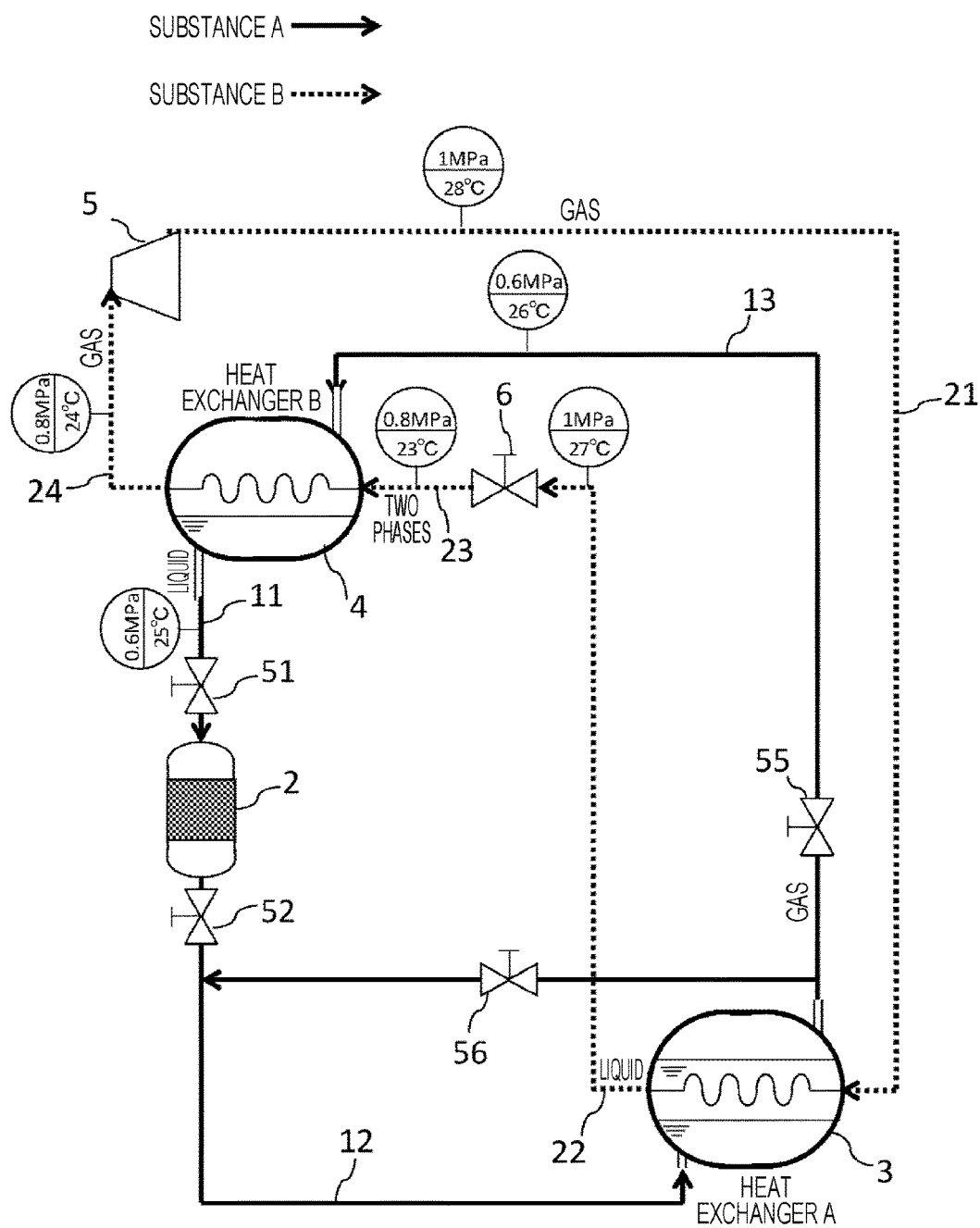
FIG. 1 is an embodiment of a configuration diagram of a solid-liquid separation device of the present invention.

Hereinafter, embodiments of the present invention will be described with reference to the drawings.

First Embodiment

A solid-liquid separation device and a method thereof of the present invention can individually separate a mixture of a solid, water, and oil into a solid, water, and oil. Further, the solid-liquid separation device and the method can be used for a combination of a solid and water, and a combination of a solid and oil. To be specific, the solid-liquid separation device and the method can be applied to various types of solid-liquid separation such as separation of water, oil, and a solid of sludge generated in water treatment, purification of soil contaminated with oil, dehydration/deoiling from plankton, and desorption of impurities absorbed to activated carbon used in water treatment.

Hereinafter, an embodiment for implementing the solid-liquid separation device and the method thereof of the present invention will be described using an activated carbon regeneration device as an example. However, an application example of the present invention is not limited to the activated carbon regeneration device.

A configuration of an activated carbon regeneration device that is one of application examples of the present invention will be described using FIG. 1. In the present embodiment, an example of using dimethyl ether (DME) as a substance A capable of dissolving water and oil, and fluorocarbon as a substance circulated while performing state change in a closed system (hereinafter, referred to as substance B) will be described. Further, an example of using shell and tube-type heat exchangers as two heat exchangers, and causing DME to pass through on the shell side in both the heat exchangers, will be described.

In the present embodiment, heat or cold heat necessary for phase change of DME is supplied using a refrigeration cycle of fluorocarbon. First, fluorocarbon becomes a high-temperature and high-pressure gas and is discharged from a compressor 5, and is sent through piping 21 into a tube of a heat exchanger A3. Here, the high-temperature fluorocarbon gas transfers heat of condensation to a DME side while being condensed, and thus shell-side liquefied DME uses the supplied heat as heat of evaporation to become a DME gas. Next, liquefied fluorocarbon that has become a liquid passes through piping 22, is sent to an expansion valve 6, and is decompressed at the time of passage, thereby to have the temperature and the pressure decreased, to become a two-phase flow, and is then sent through piping 23 to a tube side of a heat exchanger B4. Here, a shell-side high-temperature DME gas transfers heat of condensation to a fluorocarbon side while being condensed, and low-temperature liquefied fluorocarbon uses the supplied heat as heat of evaporation to become a fluorocarbon gas. Next, the fluorocarbon gas that has become a gas is sent through piping 24 to the compressor 5 and is compressed again, whereby a refrigeration cycle is formed.

Meanwhile, on the DME cycle side, an operation is started in a state where, first, a valve 51, a valve 52, and a valve 55 are opened and a valve 56 is closed. The liquefied DME discharged from the shell side of the heat exchanger B4 is sent through piping 11 provided with the valve 51 to a treatment tank 2 filled with used activated carbon. In the treatment tank 2, an organic matter absorbed to activated carbon is dissolved in DME together with adhering moisture. The heat exchanger A3 is installed in a lower portion than the treatment tank 2 in a vertical direction. The organic matter and water are sent while kept dissolved in the liquefied DME to the heat exchanger A3 through piping 12 provided with the valve 52 in a lower portion of the treatment tank 2. A larger amount of high-temperature fluorocarbon is continuously supplied to the heat exchanger A3 than the liquefied DME. Therefore, DME is heated by latent heat and sensible heat held by fluorocarbon, and the liquefied DME becomes a DME gas and is discharged. At this time, the water and the organic matter dissolved in the liquefied DME mostly stay in the heat exchanger A3 without being evaporated because the temperature is a boiling point or less. The discharged highly-pure DME gas is sent to the heat exchanger B4 through piping 13 provided with the valve 55. A larger amount of low-temperature fluorocarbon is continuously supplied to the heat exchanger B4 than the liquefied DME. Therefore, DME is cooled by the latent heat and sensible heat held by fluorocarbon, and the DME gas becomes a liquefied DME and is discharged.

The phase change cycle of DME of the present embodiment does not need fluid transfer means such as a compressor or a pump, and is characterized in use of gravity as drive force of the flow of DME. A principle of the characteristic will be described below. The center of gravity of the heat exchanger B4 is installed at a higher position than the center of gravity of the heat exchanger A3 in the vertical direction, and lower portions of both the heat exchangers B4 and A3 are coupled with piping through the treatment tank 2. Therefore, in a steady state, a liquid level of DME in the heat exchanger B4 and a liquid level of DME in the heat exchanger A3 are nearly equal. Here, when the DME gas is liquefied in the heat exchanger B4 by the operation of the fluorocarbon cycle, the liquefied DME is increased and thus the liquid level slightly rises. At this time, the liquid level of DME in the heat exchanger B4 becomes higher than the liquid level of DME in the heat exchanger A3. Therefore, immediately after that, the liquefied DME is spontaneously moved to the heat exchanger A3 side due to an influence of gravity such that the liquid levels become equal. Meanwhile, on the gas side of the DME cycle, the DME gas in the heat exchanger B4 is cooled by the refrigeration cycle of the substance B and is thus liquefied and decreased, and the liquefied DME is gasified by the refrigeration cycle of the substance B and the DME gas is thus increased in the heat exchanger A3. Therefore, a difference in internal pressure is caused between the heat exchanger B4 and the heat exchanger A3, but the two heat exchangers are connected through the piping 13. Therefore, the DME gas is moved to the heat exchanger B4 on a lower pressure side to decrease the difference in internal pressure between the heat exchangers. As described above, the present embodiment has a device configuration in which a circulation direction of the liquefied DME and a circulation direction of the DME gas accord with each other. Therefore, the phase change cycle of DME can be circulated only with transfer of heat.

The above is an operation method in a steady state. The present embodiment has a characteristic in an operation method in a non-steady state. When regeneration of activated carbon filled in the treatment tank 2 is completed, taking out of activated carbon or pouring of filthy water into the treatment tank 2 is needed. Therefore, removal of the liquefied DME in the treatment tank 2 is necessary as a preliminary step. Therefore, typically, if the valve 51 and the valve 52 are closed and the treatment tank 2 is gradually opened to the atmosphere, the liquefied DME becomes the DME gas and emitted to an outside, and thus the objective can be achieved. However, evaporation latent heat of the liquefied DME is large, and thus the liquefied DME is cooled to the boiling point at the atmospheric pressure at the time of evaporation, and the liquefied DME remains. In addition, collection of DME opened to the atmosphere is difficult, and thus a large amount of DME needs to be supplied to the cycle at the start of a regeneration operation of activated carbon. Therefore, running cost is increased. In contrast, in the present embodiment, the liquefied DME is replaced with the DME gas before open of the treatment tank 2. Therefore, an emission amount can be reduced.

As a procedure, first, the valve 51 and the valve 55 are closed and the valve 56 is opened after completion of the regeneration operation of activated carbon, and the operation of the refrigeration cycle of fluorocarbon is started. The DME gas discharged from the heat exchanger A3 passes through the valve 56 and is supplied to the treatment tank 2. In this process, a part of the DME gas is liquefied. However, the liquefied DME in the treatment tank 2 is replaced with the DME gas by continuous generation of the DME gas. Next, the treatment tank 2 is opened after the valve 52 and the valve 56 are closed, whereby DME to be emitted to an outside can be substantially reduced, and work time can be substantially reduced because there is no residual liquefied DME.

Further, in the present invention, the flow path of the substance B (fluorocarbon) is installed above the liquid level of the substance A (DME) in the second heat exchanger B, and thus boiling heat transfer and heat of condensation transfer occur at the same time. Therefore, the heat exchange efficiency is improved. Further, the flow path of the substance B (fluorocarbon) is installed below the liquid level of the substance A (DME) in the first heat exchanger A, and thus the boiling heat transfer and the heat of condensation transfer occur at the same time. Therefore, the heat exchange efficiency is improved. Further, oils and fats can be extracted by filling the treatment tank 2 with plant cells or animal cells. Further, moisture can be removed from sludge by filling the treatment tank 2 with sludge generated in water treatment. Further, a plurality of the treatment tanks 2 is prepared and is filled with activated carbon, and filthy water and the substance A are caused to alternately flow by switching of a flow path to be connected, so that absorption and desorption of a contaminant can be alternately performed. Therefore, the filthy water can be continuously purified.

Figure 2:
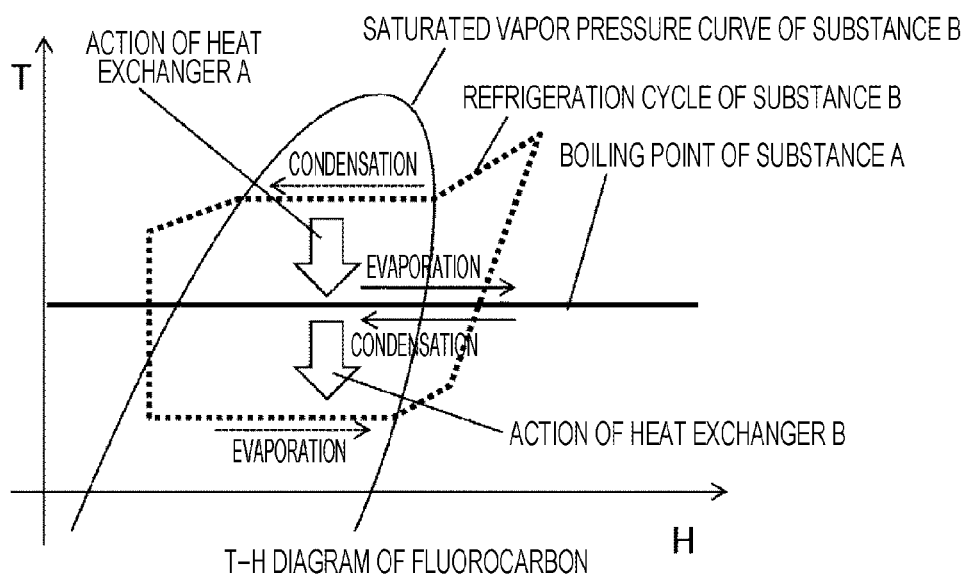
FIG. 2 is an example of a temperature-entropy diagram (T-H diagram) illustrating phase change of two types of substances used in the present invention.

FIG. 2 is a diagram illustrating a relationship between a T-H diagram illustrating a cycle of the substance B and the temperature of the substance A at the time of operation, used in the present invention. The substance B goes through processes of compression, condensation, expansion, and evaporation, similarly to a normal refrigeration cycle. Among the processes, a large amount of latent heat occurs in the condensation process, and is thus transferred to the substance A at a lower temperature and is used as heat of evaporation of the substance A. Further, the substance B in the evaporation process needs evaporation latent heat, and thus receives heat of condensation of the higher-temperature substance A. The temperature of the substance A at this time is always operated to near the boiling point.

In the present invention, the amounts of circulation are designed and controlled such that, in both the substance A and the substance B, the latent heat rather than the sensible heat consists mostly of the amounts of heat transferred in the heat exchanger A3 and the heat exchanger B4, that is, the latent heat of both the substance A and the substance B becomes equal. This is because the heat transfer efficiency at the time of boiling and condensation is substantially higher than the heat transfer efficiency of the gas and the liquid, and this is to improve the heat exchange efficiency to contribute to downsizing of the heat exchangers. Further, the refrigeration cycle of the substance B in this condition can make a temperature difference small, unlike air conditioners. The temperature in the condensation process may just be made slightly higher than the boiling point of the substance A, and the temperature of the evaporation process may just be made slightly lower than the boiling point of the substance A. Therefore, power at the time of compression necessary for circulation of fluorocarbon can be suppressed.

In the activated carbon regeneration device of the present invention, the phase change cycle of the substance A can be circulated a plurality of times. This is because the degree of solubility to the substance A differs depending on the contaminant adhering to activated carbon, and a substance that is not completely mixed with the substance A exists. The high-pure substance A is continuously supplied through circulation of the substance A to sufficiently dissolve the substance with a low degree of solubility, thereby to improve removal efficiency of impurities.

Second Embodiment

Figure 3:
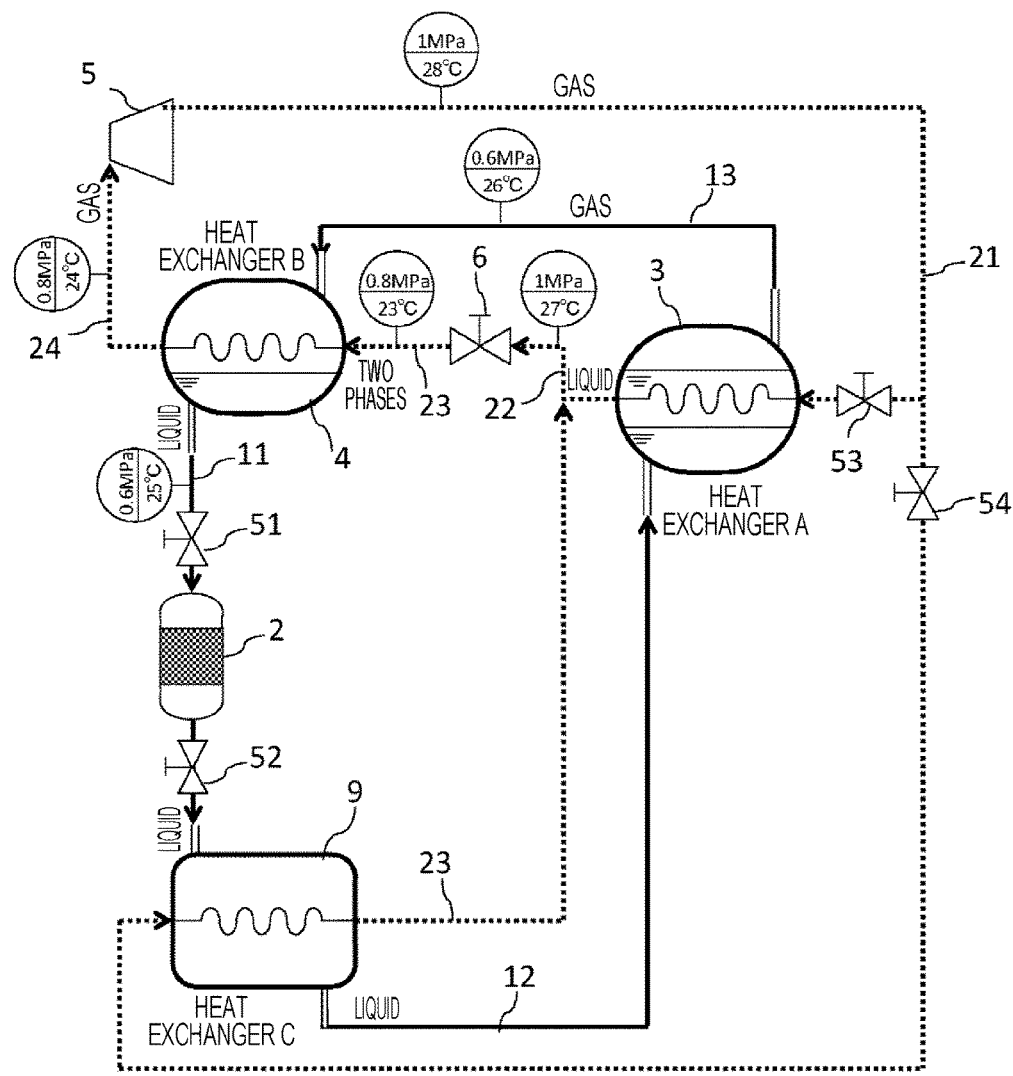
FIG. 3 is another embodiment of a configuration diagram of a solid-liquid separation device of the present invention.

An activated carbon regeneration device of another embodiment of the present invention will be described using FIG. 3. The present embodiment is different from the embodiment of FIG. 1 in that a heat exchanger C9 is installed in a phase change cycle of a substance A.

The present embodiment has a configuration in which the heat exchange C9 is installed in a lower portion of a treatment tank 2 in a vertical direction, and installed downstream of the treatment tank 2, and a substance A flows to a shell side of the heat exchanger C9. A tube side of the heat exchanger C9 is connected in parallel with a heat exchanger A3 as viewed from a circulation path of a substance B, and the heat exchanges to be used can be switched by upstream valve 53 and valve 54.

In an operation in a steady state, the heat exchanger A3 is used with the valve 54 closed and the valve 53 opened to construct phase change cycles of the substance A and the substance B, similarly to the embodiment illustrated in FIG. 1. At this time, the substance B does not flow to the tube side of the heat exchanger C9. Therefore, nothing acts on the substance A that passes through the shell side, similarly to other piping groups.

Meanwhile, at the time of collection of the substance A in the treatment tank 2, a gas of the substance A is generated in the heat exchanger C9 and is replaced with a liquid in the treatment tank 2. First, a valve 51 and the valve 53 are closed and the valve 54 is opened when regeneration of activated carbon is completed. With this operation, a gas of the high-temperature substance B having passed through the valve 54 transfers heat of condensation to the liquid substance A when passing through the tube side of the heat exchanger C9. At this time, the substance A is boiled, and thus the gas of the substance A occurs and is guided to the treatment tank 2 through a valve 52. After the liquid substance A in the treatment tank 2 is completely replaced with the gas of the substance A, the valve 52 is closed and the treatment tank 2 is opened, whereby the amount of the substance A to be emitted to an outside can be reduced.

In the above-described embodiments, DME has been used as the substance A that is a regeneration medium of activated carbon and volume reduction means of the sludge. However, a similar effect can be achieved with a substance such as ethyl methyl ether, formaldehyde, ketene, or acetaldehyde.

Further, fluorocarbon has been used as the substance B in the heat source-side refrigeration cycle used in the present invention. However, a similar effect can be achieved with a refrigerant such as ammonia or isobutane.

Further, regarding the temperatures and pressures written in the drawings, the temperatures of DME are determined on the basis of an ambient temperature of the device, and the pressures of DME are saturated vapor pressures in the temperatures. Further, the condensation temperature and the evaporation temperature of the fluorocarbon cycle are determined on the basis of the temperatures of DME.

Therefore, the numerical values in the drawings are examples for description, and are changed depending on an operation condition and an environment. Therefore, the present invention is not limited to these values.

Note that the present invention is not limited to the above-described embodiments, and includes various modifications. The above embodiments have been given in detail to describe the present invention in ways easy to understand, and the present invention is not necessarily limited to one provided with all the described configurations. Further, a part of a configuration of a certain embodiment can be replaced with a configuration of another embodiment, and a configuration of another embodiment can be added to a configuration of a certain embodiment. Further, another embodiment can be added to/deleted from/replaced with a part of a configuration of the embodiments.

REFERENCE SIGNS LIST 2 treatment tank
3 heat exchanger
4 heat exchanger B
5 compressor
6 expansion valve
9 heat exchanger C

The invention claimed is:

1. A solid-liquid separation device that performs dehydration or deoiling from an object to be treated that is a mixture of water and a solid, a mixture of oil and a solid, or a mixture of water, oil, and a solid, as the object to be treated, using a substance A capable of dissolving water and oil, the solid-liquid separation device comprising:
   a substance B that is circulated while generating phase change in a closed system;
   a compressor that compresses the substance B;
   a first heat exchanger that exchanges heat of condensation of the substance B and heat of evaporation of the substance A;
   a second heat exchanger that exchanges heat of evaporation of the substance B and heat of condensation of the substance A;
   a treatment tank in which the substance A is mixed with the object to be treated, the substance A having been evaporated while separated from the water or the oil in the first heat exchanger, and condensed in the second heat exchanger, wherein
   the first heat exchanger is installed in a lower portion than the treatment tank in a vertical direction, and
   a connection port of the first heat exchanger and a lower portion of the treatment tank are connected with a flow path; and
   a third heat exchanger installed downstream of the treatment tank and upstream of the first heat exchanger in a flow path system of the substance A, and which switches a flow path of the substance B flowing into the heat exchanger 1 in an upper stream of the heat exchanger 1 to exchange heat between the substance B and the substance A, wherein
   the third heat exchanger is installed in a lower portion than the treatment tank in a vertical direction.

2. A solid-liquid separation device that performs dehydration or deoiling from an object to be treated that is a mixture of water and a solid, a mixture of oil and a solid, or a mixture of water, oil, and a solid, as the object to be treated, using a substance A capable of dissolving water and oil, the solid-liquid separation device comprising:
   a substance B that is circulated while generating phase change in a closed system;
   a compressor that compresses the substance B;
   a first heat exchanger that exchanges heat of condensation of the substance B and heat of evaporation of the substance A;
   a second heat exchanger that exchanges heat of evaporation of the substance B and heat of condensation of the substance A;
   a treatment tank in which the substance A is mixed with the object to be treated, the substance A having been evaporated while separated from the water or the oil in the first heat exchanger, and condensed in the second heat exchanger; and a third heat exchanger installed downstream of the treatment tank and upstream of the first heat exchanger in a flow path system of the substance A, and which switches a flow path of the substance B flowing into the heat exchanger 1 in an upper stream of the heat exchanger 1 to exchange heat between the substance B and the substance A, wherein the third heat exchanger is installed in a lower portion than the treatment tank in a vertical direction.

3. The solid-liquid separation device according to claim 1, wherein a flow path of the substance B is installed above a liquid level of the substance A in the second heat exchanger.

4. The solid-liquid separation device according to claim 1, wherein a flow path of the substance B is installed below a liquid level of the substance A in the first heat exchanger.

5. A biofuel extraction device, wherein in the solid-liquid separation device according to claim 1, oils and fats are able to be extracted by filling the treatment tank with plant cells or animal cells.

6. A sludge treatment device, wherein in the solid-liquid separation device according to claim 1, moisture is able to be removed from sludge that is generated in water treatment by filling the treatment tank with the sludge.

7. A water treatment device, wherein in the solid-liquid separation device according to claim 1, filthy water is able to be continuously purified by filling the treatment tank with activated carbon, and alternately switching the filthy water and the substance A to cause the filthy water and the substance A to come in contact with the activated carbon.

8. A water treatment device, wherein in the solid-liquid separation device according to claim 1, the substance A is dimethyl ether.

* * * * *